United States Patent
Knappe

(10) Patent No.: US 8,141,590 B2
(45) Date of Patent: Mar. 27, 2012

(54) ARRANGEMENT FOR SEALING AN END SECTION OF A TUBE OR OF A TUBULAR VESSEL

(76) Inventor: Holger Knappe, Malataverne (FR)

( * ) Notice: Subject to any disclaimer, the term of this patent is extended or adjusted under 35 U.S.C. 154(b) by 296 days.

(21) Appl. No.: 12/311,293

(22) PCT Filed: Sep. 26, 2006

(86) PCT No.: PCT/EP2006/009346
§ 371 (c)(1),
(2), (4) Date: Mar. 25, 2009

(87) PCT Pub. No.: WO2008/037274
PCT Pub. Date: Apr. 3, 2008

(65) Prior Publication Data
US 2010/0032043 A1 Feb. 11, 2010

(51) Int. Cl.
*F16L 55/10* (2006.01)
(52) U.S. Cl. ............................................. 138/89; 138/90
(58) Field of Classification Search .................... 138/89, 138/90
See application file for complete search history.

(56) References Cited

U.S. PATENT DOCUMENTS

| | | | | |
|---|---|---|---|---|
| 2,107,315 A * | 2/1938 | Wainwright | ..................... | 138/89 |
| 2,237,029 A | 4/1941 | Fischer | ..................... | 292/256.71 |
| 3,006,680 A * | 10/1961 | Gregory | ......................... | 294/93 |
| 3,442,294 A * | 5/1969 | Bischoff et al. | .................. | 138/90 |
| 3,483,894 A | 12/1969 | Finocchiaro | ..................... | 138/90 |
| 3,626,475 A * | 12/1971 | Hicks | ............................. | 138/94 |
| 3,931,670 A | 1/1976 | Arnold | ............................. | 29/157 |
| 4,202,377 A * | 5/1980 | Harrison | ......................... | 138/94 |
| 4,687,026 A | 8/1987 | Westman | ........................ | 138/89 |
| 4,693,278 A * | 9/1987 | Wilson et al. | ................... | 138/89 |
| 5,230,437 A | 7/1993 | Kelly | ............................ | 220/237 |
| 5,307,841 A * | 5/1994 | Condon | ......................... | 138/90 |
| 7,117,909 B2 * | 10/2006 | Jarrett et al. | ................... | 152/416 |
| 2004/0200840 A1 | 10/2004 | Oser et al. | ...................... | 220/315 |
| 2005/0121091 A1* | 6/2005 | Sayers et al. | .................... | 138/89 |
| 2006/0049093 A1 | 3/2006 | Chikura et al. | ........... | 210/321.83 |

FOREIGN PATENT DOCUMENTS

| | | |
|---|---|---|
| DE | 36 39 932 | 6/1988 |
| WO | WO 97/35125 | 9/1997 |
| WO | WO 2004/001269 | 12/2003 |
| WO | WO 2004/057230 | 7/2004 |

* cited by examiner

*Primary Examiner* — James Hook
(74) *Attorney, Agent, or Firm* — Nash and Titus, LLC

(57) ABSTRACT

The invention relates to an arrangement for sealing an end section of a tube or of a tubular vessel with a sealing plate arranged pointing toward the tube, and a front plate arranged pointing away from the tube. A peripheral seal is arranged in the outer region of the plates and is disposed at least partly between the sides which point toward one another. The invention provides an arrangement for sealing an end section of a tube or of a tubular vessel, which prevents passage of a medium either out of or into the vessel. This is achieved by virtue of the arrangement, where on at least one of the sides of the plates pointing toward one another in the sealing region, there is a projection which, when forced by pressure onto the sealing plate, brings about a deformation of the seal in the direction of the inner wall of the tube or tubular vessel. This results in an increase in the sealing action, and by virtue of the tensioning element with which the deformation of the seal, which arises through the pressurization can be maintained in the unpressurized or low-pressurized state of the sealing plate.

14 Claims, 5 Drawing Sheets

ARRANGEMENT FOR SEALING AN END SECTION OF A TUBE OR OF A TUBULAR VESSEL

FIELD OF THE INVENTION

The invention relates to an arrangement for sealing an end section of a tube or a tubular vessel with a sealing plate placed pointing toward the tube and a front plate placed pointing away from the tube, whereby in the outer area of the plate a peripheral seal is placed, which is at least partly between the sides of the plate pointing toward each other.

BACKGROUND OF THE INVENTION

Such locking arrangements are known. They are used for example in tubular vessels to admit membrane filters in water treatment. With this, they are placed in the end area of the tubular vessel and when the interior of the vessel is impinged on by a pressurized medium, they are held in the end section. Between the front plate and the sealing plate there is a seal which causes an insulation of the intermediate space between the plate and the inner wall of the vessel. The seal is located in a groove placed in or between the plates. Owing to the inner side of the sealing plate being impinged on by a pressurized medium, the seal presses against the inner wall of the vessel. If the pressure against the sealing plate is reduced below a threshold value, the seal is de-tensioned also, so that with renewed impingement, fluid can pass through the sealing area until an optimal sealing action again is achieved. This is especially problematical if the pressurized impinging medium is environmentally hazardous chemicals, or if, owing to the purity of the impinged medium, impurities must be prevented from being admitted into the interior of the container.

Another embodiment of the state of the art makes provision for use of an O ring in the groove. This insert requires major prestressing or pre-pressing of the lock vis-à-vis the pipe, that can be attained only via an expensive set of special tools. With this, what is problematical is insertion and particularly removal of the lock, especially at large tube diameters.

The task of the invention is to make available an arrangement for locking an end section of a tube or a tubular vessel, by which impingement of the medium either out of the vessel or into the vessel is avoided, and insertion and removal is simple without a large set of special tools.

SUMMARY OF THE INVENTION

The problem is solved according to the invention by placing a projection on at least one of the sides of the plate that point toward each other in the sealing area, which causes a deformation of the seal in the direction of the inner wall of the tube or tubular vessel when pressure impinges on the sealing plate, to obtain an increase in sealing action, and that a tensioning element is provided, with which the deformation of the seal arising via the impingement is maintainable in a state of no or slight pressure impingement.

Due to provision of the projection in the sealing area, a larger deformation of the seal is effected. The deformation can also be provided if only slight pressures act on the inner side of the sealing plate. If the pressure impingement occurs to the full extent, then owing to the tensioning element, deformation of the seal can also be maintained in simple fashion in a case where pressure impingement on the inner side of the sealing plate is reduced.

At the same time it is easy to install and remove the invention-specific arrangement. Since no pre-pressing is necessary, installation is done with no force and essentially contact-free in relation to the tube. The sealing is effected through pressure impingement of the sealing plate, through which the seal is deformed. Removal is also force-free and essentially contact-free, since in its pressure-impinged state, the tensioning element is released, which is possible in an easy fashion. Then the pressure impingement on the sealing plate is removed, through which the arrangement is in the tube with no pre-stressing and can be removed, since there is no pre-pressing.

One advantageous teaching of the invention makes provision that the seal is a lip seal. With a lip seal, improved sealing action can be achieved. Also, the use of an O ring, a double lip seal or quad ring are alternative possibilities. In addition, at the ends of the lip seal, pattern removals can be provided, which cause a strengthening of the sealing.

Additionally, one embodiment of the invention makes provision that in the area for attaching the seal, a groove is provided, with the groove preferably placed on the sealing plate and/or on the front plate. Owing to provision of a groove, better attachment of the seal, and at the same time improved sealing action can be attained.

A further teaching of the invention makes provision for the projection to be wedge-shaped. This is advantageous, since a dosed application of the deformation into the seal can be attained. The projection can also be placed on both sides of the plate, and thus the seal can be compressed from both sides. A further teaching of the invention makes provision that the seal be wider than the groove. By providing a wider seal, improved sealing action can be attained.

Further, it is advantageous that the tensioning element acts against the front plate, and this is restrained vis-à-vis the sealing plate. In this simple way, a maintaining of the deformation of the seal, and thus of the sealing action vis-à-vis the inner wall of the tube or tubular vessel is attained. It is advantageous if the tensioning element is a nut. It is especially preferred if the nut is screwed onto a projection of the sealing plate which penetrates through the front plate. Especially preferred in this is if the projection is designed to be movable vis-à-vis the front plate. This represents a simple embodiment form, able to be provided in cost-effective fashion. In addition, with provision of a nut, it is possible to effect the locking by simple screwing of the nut against the front plate, with a manually tight screwing-on being sufficient to provide a sealing action.

A further teaching of the invention provides that the arrangement is held by supports in the tube or tubular vessel. With this it is preferred that the support is a restraining ring which engages into a recess in the tube or tubular vessel. With this it is especially preferred that the support consists of segments. It is especially preferred for the support to be connected by means of locks with the front plate. In this way, the arrangement is easily connected with the inner wall of the tube or tubular vessel.

A further teaching of the invention provides that the seal can be pre-stressed by means of a tensioning element. Through an initial pre-stressing of the tensioning element, such as before placing it in service for the first time, a first deformation of the seal vis-à-vis the inner side of the tube or tubular container is caused, and thus a first sealing action is generated.

DESCRIPTION OF THE PREFERRED EMBODIMENTS

Figure 1:
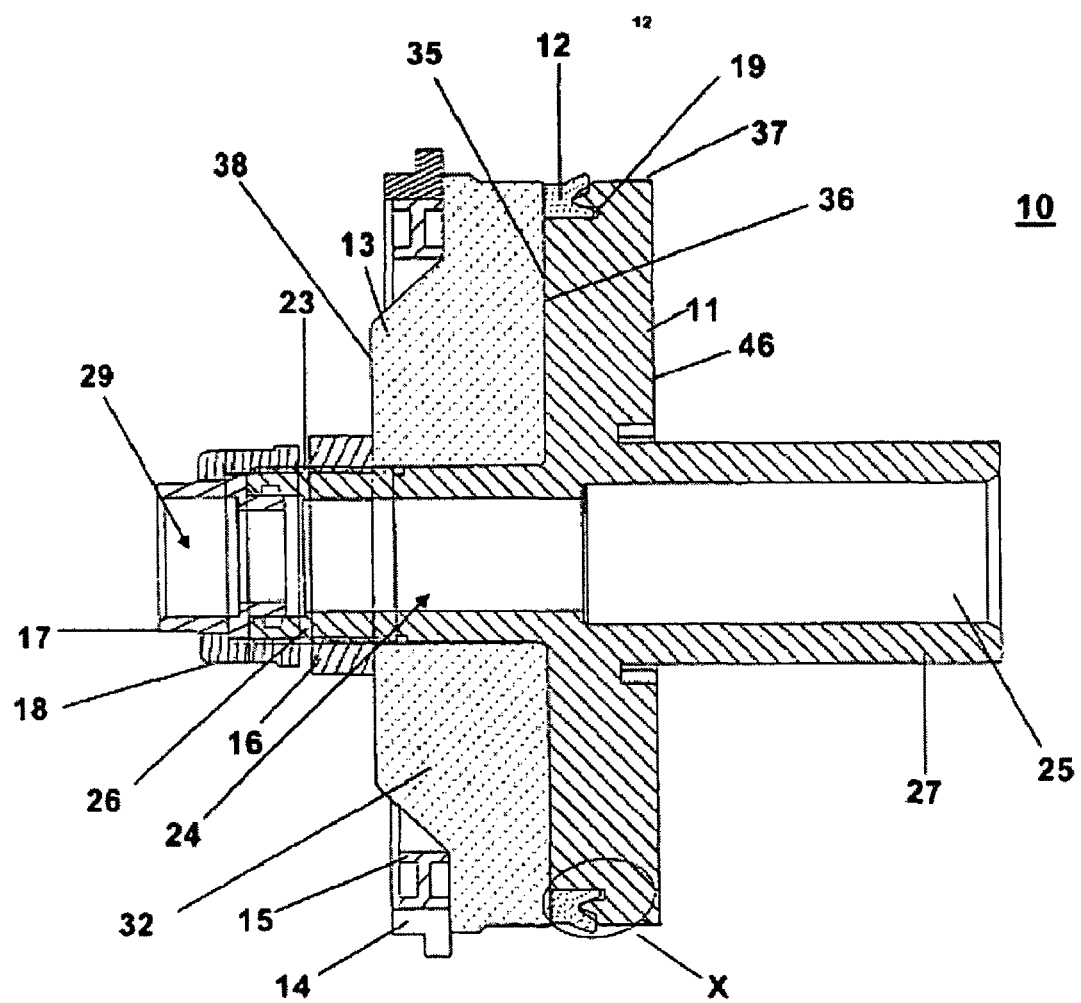
FIG. 1 shows a section view through an invention-specific arrangement.

In what follows, the invention is explained in greater detail using a drawing of an invention-specific embodiment, with the following shown in the drawing:

FIG. 1 shows a section view of an invention-specific arrangement 10. The arrangement 10 consists of a sealing plate 11 and a front plate 13, which touch each other on the outward-pointing wall 36 of the sealing plate and the inward-pointing wall 35 of front plate 13. On the outer radial end 37 of sealing plate 11, a groove 19 is provided, into which a seal 12 is inserted. Front plate 13 has in its middle a first opening 24 through which a projection 26 of sealing plate 11 is inserted. Sealing plate 11 additionally has an attachment section 27 directed away from front plate 13. In the interior of attachment section 27 and of projection 26, a channel 25 is provided, that runs through the entire sealing plate 11. The outer end of projection 26 is provided with a threaded section 23. On threaded section 23, a tensioning element 16 is screwed on in the form of a nut. In its fully-screwed-on state, the nut 16 is in contact with a front surface 38 of front plate 13. Into the outer end of projection 26 and of channel 25, an attachment piece 17 is inserted, that is connected by an attachment element 18 in the form of a nut with projection 26. Nut 18 is likewise screwed on the threaded section 23 of projection 26. On the front surface 28, a support 14 is placed, which is constructed from three segments, whereby the segments in the transition areas 33, 34 (see FIG. 4) are placed toward each other. Segment transition 33 is placed perpendicular to the front surface 38 of front plate 13, while segment transitions 34 are placed at an incident angle to front surface 38. On the support 14, a locking ring 25 is provided, which presses the support segments 14 against the front surface 38 of front plate 13. In the locking ring 15, boreholes 28 are provided, which correspond with the boreholes 31 of front plate 13. The locking ring 15 is connected to hold with front plate 13 by means of screws which are not shown. In addition, front plate 13 has a projection 32.

Figure 2:
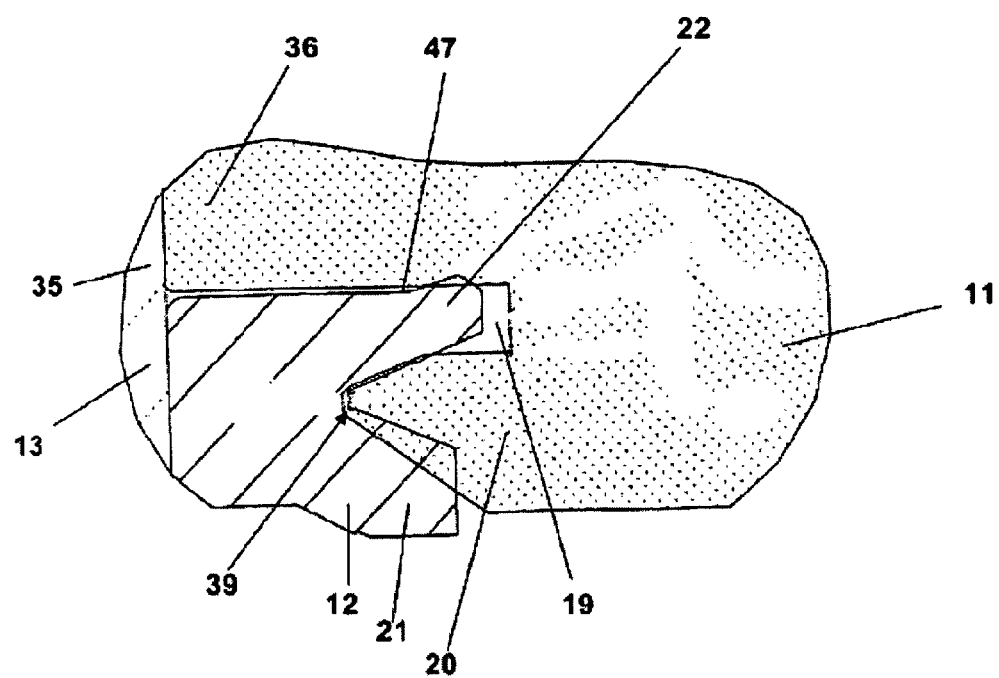
FIG. 2 shows an enlarged view of section X from FIG. 1.

The seal 12 is placed in the groove 19, for which see FIG. 2. Seal 12 is embodied as a lip seal, which has an outer lip 21 and an inner lip 22, between which a recess 39 is provided. Into recess 39, a projection 20 of sealing plate 11 engages, which is here designed to be wedge-shaped. This wedge-shaped projection 20 uses pressure impingement to compress an inner wall 46 of sealing plate 11 into the recess 39 of seal 12, and to cause the inner and outer lips 21, 22 to shift away from each other, one against the inner side 47 of groove 19 and the other against an inner wall, here a liner 51, of a tube 50, for which see FIG. 5.

Figure 3:
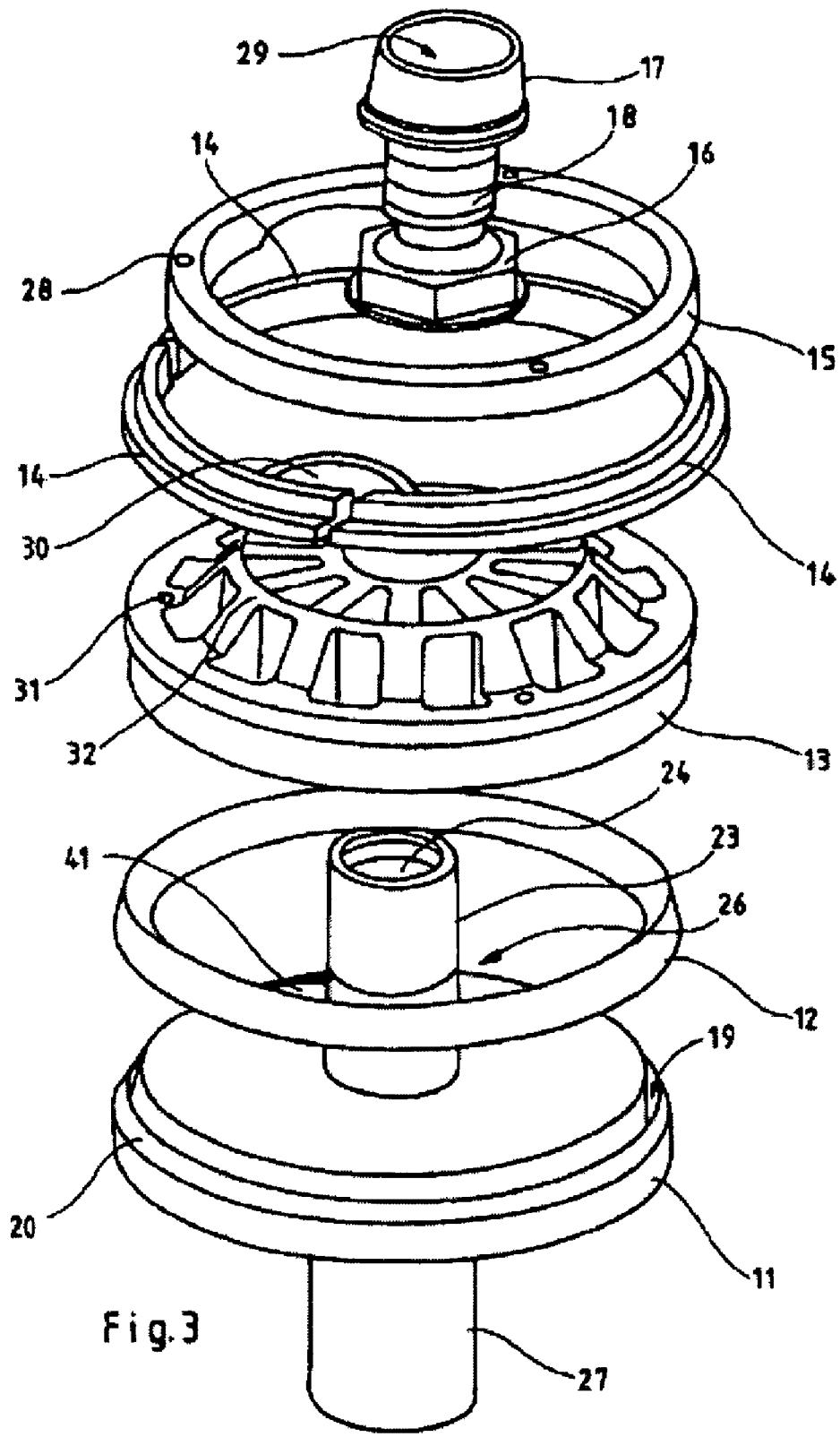
FIG. 3 shows an exploded view of an invention-specific arrangement.

FIG. 3 shows an exploded view of the invention-specific arrangement 10. In viewing this FIG. 3, the invention-specific design of the arrangement 10 becomes clear. Especially well perceived is the groove 19 and the wedge-shaped projection 20. Additionally visible is a second asymmetric opening 41 in sealing plate 11 and a second asymmetric opening 30 in front plate 13. The attachment piece 17 has an outlet 29.

Figure 4:
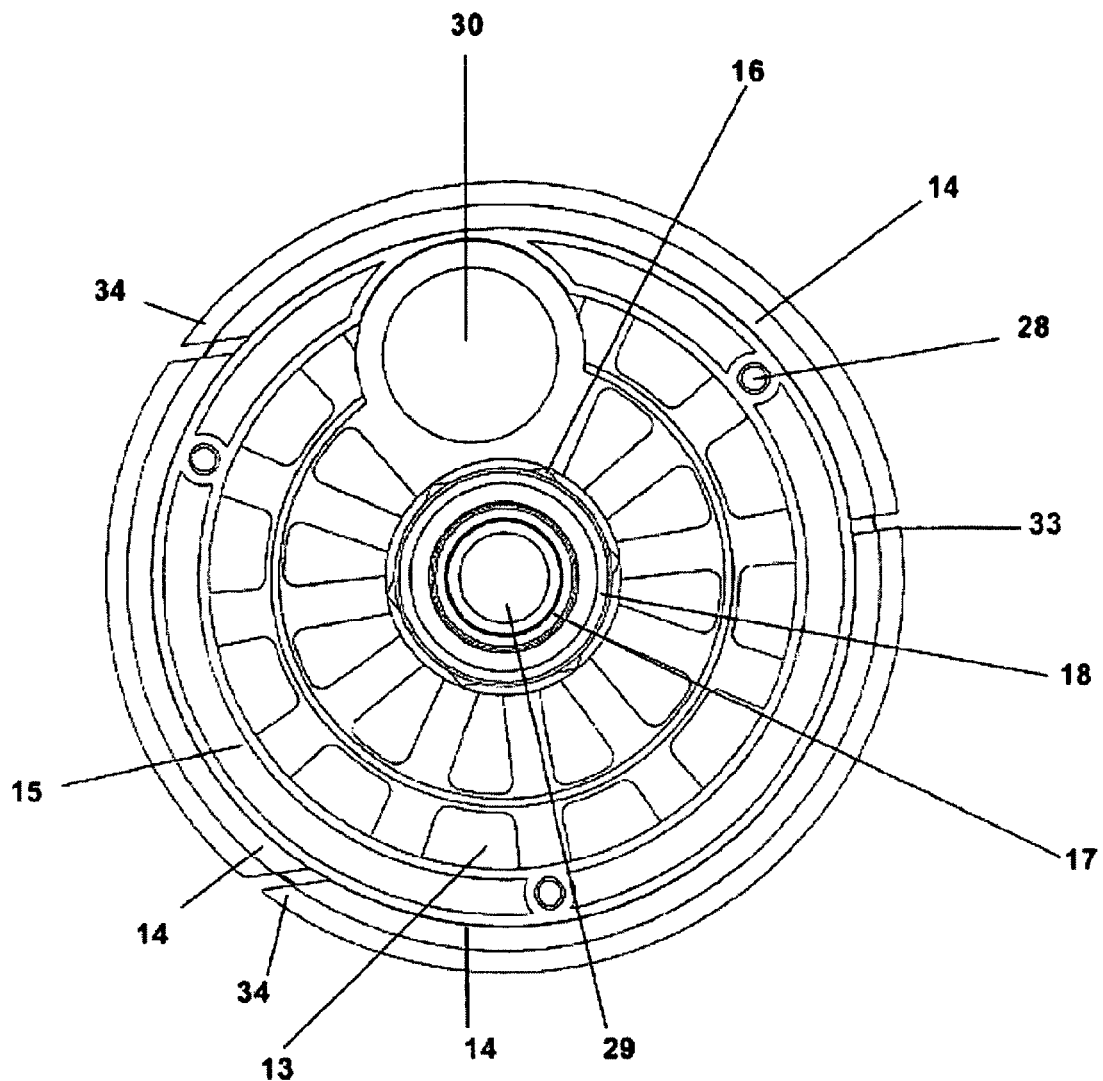
FIG. 4 shows a top-down view of an invention-specific arrangement.

FIG. 4 shows a top-down view of the previously described elements and of front plate 13.

Figure 5:
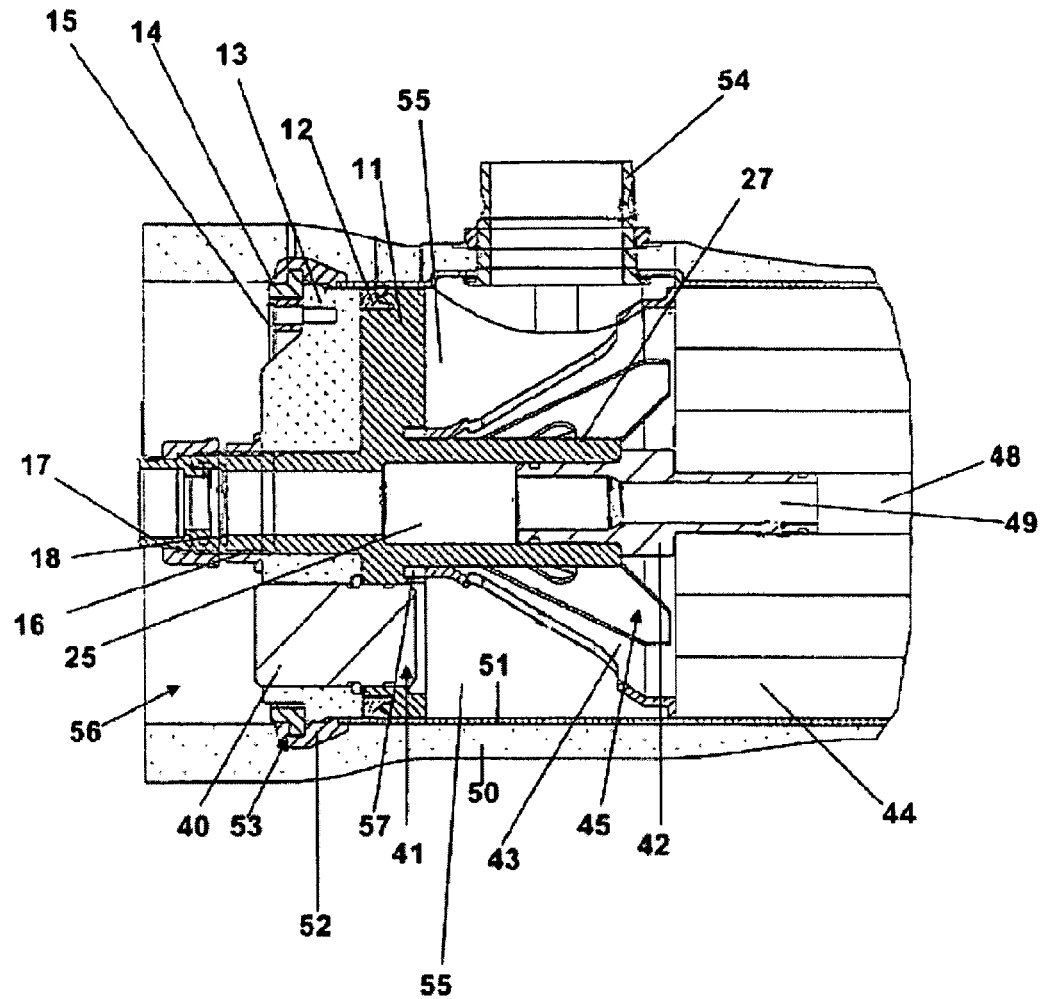
FIG. 5 shows a section view through an invention-specific arrangement in its installed state in a tubular vessel.

FIG. 5 depicts the arrangement 10 in its installed state in a tube 50. Along with the arrangement 10, in the tube 50 there is a membrane filter 44, which has a central channel 48. In the central channel 38 an attachment element 42 is placed, which in turn is inserted into the attachment section 27 of sealing plate 11. Attachment element 42 has a channel 39, which effects a through-running channel from the central channel 48 to the outlet 29 on the outermost tube of the opposite end of the arrangement 10. On the inner wall 46 of sealing plate 11, an annular recess 57 is provided, which is placed around attachment section 27. Into recess 57 a spacer element 43 is inserted, which admits membrane filter 44 in supporting fashion on its end facing away from sealing plate 11. Spacer element 43 has intermediate spaces 45, through which fluids that do not emerged from membrane filter 44 in the central area, can enter into a receiving space 55 of tube 50. Receiving space 55 is connected with an outlet 54, through which the emerging fluid can drain out of receiving space 55. If outlet 54 is used, then, as depicted in FIG. 5, the second opening 41 of sealing plate 11 and the second opening 30 of front plate 13 are closed with a plug 40. In the area of a front tube section 56 of tube 50, an insert 52 is placed into the end area of liner 51 into the wall of tube 50, which has a recess 53. Into recess 53, the support segments 14 of the arrangement 10 are inserted, so that the arrangement 10 is held in the tube.

During a first installation of the arrangement 10 in tube 50, the attachment element 42 is inserted into the central channel 48 of membrane filter 44. Then the spacer element 43 is inserted and sealing plate 11 is put on attachment element 42 and spacer element 43. While this is occurring, seal 12 is already attached to sealing plate 11. Then front plate 13 is attached onto projection 26 and slid against the outer wall 36 of sealing plate 11. Then the support elements 14 are inserted into recess 52, and the locking ring for connecting the front plate is screwed with the support against front plate 13. Then, tensioning element 16 is loosely screwed onto the threaded section 23 of projection 26 against the front plate 13.

Then the membrane filter can either be pressure-loaded, so that pressure is built up on the inner wall 46 of sealing plate 11, and it is shifted against front plate 13 and against support 14. With the pressure-loaded shift, seal 12 or the sealing lips 21 and 22 are deformed by the wedge-shaped projection 20, by which an improvement in sealing action is produced or sealing action is created for the first time. Then, tensioning element 16 is screwed against front plate 13, so that after pressure reduction, the attained deformation of seal 12 can be maintained. Here often a hand-tight screwing-on suffices. Thus an automatic sealing is generated or the sealing force is made available automatically when the arrangement 10 starts to be used in accordance with instructions. The arrangement 10 is dismantled, for maintenance tasks, for example, on the tubular container 50, in reverse order. Tensioning element 16 is loosened by manual loosening of the nut, for example, sealing plate 11 ceases to be pressure loaded, seal 12 detensions itself, and the arrangement 10 can start to be dismantled by loosening locking ring 15. As with the installation, special tools are not needed.

As an alternative, before pressure is built up on the inner wall 46 of sealing plate 11, the tensioning element 16 can be screwed on the threaded section 12 against front plate 13, to effect a pre-stressing between sealing plate 11 and front plate 13, and thus a deformation of seal 12. Then pressure impingement is undertaken, the seal 12 is further deformed, and then tensioning element 16 is screwed further against front plate 13 on the threaded section 23. As an alternative, a self-tensioning tensioning device can be used as tensioning element 16.

In addition the attachment piece 16 can be inserted on projection 26 or into channel 25 of projection 26, and the attachment element 18 can be screwed onto the threaded section 23 for attachment of attachment piece 17 with sealing plate 11. The fluid filtered by membrane filter 44 passes through central channel 48 and the channel 49 via channel 25 out of the outlet 29 of attachment piece 17. Untreated or inadequately treated fluid gets from the membrane filter through intermediate space 45 into receiving space 55, and from there either out of the outlet 54 from tube 50 or through the second opening 41 and the second opening 30 through the arrangement 10, out through tube 50.

LIST OF REFERENCE NUMBERS

10 Arrangement
11 sealing plate
12 seal
13 front plate
14 support or support segment
15 sealing ring
16 tensioning element or nut
17 attachment piece
18 attachment element or nut
19 groove
20 projection
21 outer lip
22 inner lip
23 threaded section
24 first opening in front plate, center
25 channel
26 projection
27 attachment section
28 borehole
29 outlet
30 second opening in front plate, asymmetrical
31 borehole
32 projection of front plate
33 segment transition, perpendicular
34 segment transition, inclined
35 inner side of front plate
36 outer side of attachment plate
37 outer radial end of attachment plate
38 front surface
39 recess
40 plugs
41 second opening of sealing plate, asymmetric
42 attachment element
43 spacer element
44 membrane filter
45 intermediate space
46 inner wall of sealing plate
47 inner side of groove
48 central channel
49 channel
50 tube
51 liner
52 insert
53 recess
54 outlet
55 receiving space
56 tube section
57 recess

The invention claimed is:

1. An arrangement for sealing an end section of a tube or of a tubular vessel comprising a sealing plate positioned pointing to the tube and a front plate positioned facing away from the tube, and a tensioning element,
    which tube or tubular vessel comprises an inner wall, and which sealing plate and front plate each comprise an outer edge area and inner sides,
    whereby a circumferential seal is positioned in the outer edge area of the plates, which at least partially is between the inner sides of the plates facing toward each other,
    wherein on at least one of the inner sides of the plates facing each another there is positioned in the area to form a seal a projection, which, when pressure from liquid is exerted upon the sealing plate causes a deformation of the seal in the direction of the inner wall of the tube or tubular vessel so as to maintain or increase a sealing effect of the circumferential seal,
    and wherein the tensioning element, due to the exertion of pressure from liquid, maintains the deformation of the seal when the sealing plate is in the state in which it is not acted upon by pressure or is only acted upon by pressure to a slight extent.

2. The arrangement according to claim 1, wherein the seal is a lip seal.

3. The arrangement according to claim 1, which further comprises a groove positioned in the area for attaching the seal between the plates.

4. The arrangement according to claim 3, wherein the groove is positioned on the sealing plate and/or on the front plate.

5. The arrangement according to claim 3, wherein the seal is wider than the groove.

6. The arrangement according to claim 1, wherein the projection is wedge-shaped.

7. The arrangement according to claim 1, wherein the tensioning element acts against the front plate and locks it vis-à-vis the sealing plate.

8. The arrangement according to claim 1, wherein the tensioning element is a nut.

9. The arrangement according to claim 8, wherein the nut is screwed onto a projection of the sealing plate, which passes through the front plate.

10. The arrangement according to claim 1, wherein the tube or tubular vessel further comprises at least one support, and the arrangement is held by the at least one support.

11. The arrangement according to claim 10, wherein the at least one support comprises a retaining ring, which engages into a recess in the tube or tubular vessel.

12. The arrangement according to claim 10, wherein the at least one support comprises segments.

13. The arrangement according to claim 10, wherein the arrangement further comprises a locking ring, and the at least one support is connected with the front plate by the locking ring.

14. The arrangement according to claim 1, wherein the tensioning element pre-stresses the seal.

* * * * *